(12) United States Patent
Zhang et al.

(10) Patent No.: US 11,151,398 B2
(45) Date of Patent: Oct. 19, 2021

(54) ANTI-COUNTERFEITING PROCESSING METHOD, ELECTRONIC DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 111 days.

(21) Appl. No.: 16/718,006

(22) Filed: Dec. 17, 2019

(65) Prior Publication Data

US 2020/0125874 A1 Apr. 23, 2020

Related U.S. Application Data

(63) Continuation of application No. PCT/CN2018/096831, filed on Jul. 24, 2018.

(30) Foreign Application Priority Data

Jul. 29, 2017 (CN) .......................... 201710634320.6

(51) Int. Cl.
*G06K 9/00* (2006.01)
*G06T 5/00* (2006.01)

(52) U.S. Cl.
CPC ....... *G06K 9/00906* (2013.01); *G06K 9/0061* (2013.01); *G06K 9/00281* (2013.01); *G06T 5/002* (2013.01)

(58) Field of Classification Search
None
See application file for complete search history.

(56) References Cited

U.S. PATENT DOCUMENTS

| | | | | |
|---|---|---|---|---|
| 6,095,650 A | * | 8/2000 | Gao ..................... | G02C 13/005 351/227 |
| 6,231,188 B1 | * | 5/2001 | Gao ..................... | G02C 13/003 351/227 |

(Continued)

FOREIGN PATENT DOCUMENTS

| | | |
|---|---|---|
| CN | 101833646 A | 9/2010 |
| CN | 102324025 A | 1/2012 |

(Continued)

OTHER PUBLICATIONS

International search report issued in corresponding international application No. PCT/CN2018/096831, dated Nov. 11, 2018 (2 pages).

(Continued)

*Primary Examiner* — Soo Shin
(74) *Attorney, Agent, or Firm* — Young Basile Hanlon & MacFarlane, P.C.

(57) ABSTRACT

A method for anti-counterfeiting processing and related products are disclosed. The method may include: acquiring a face image and an iris image, wherein both the face image and the iris image are from a target object; determining a positional relationship between the iris image and the face image, and performing living body detection according to the iris image; and in response to the positional relationship satisfying a pre-set condition and the iris image being from a living body, determining that the target object is a true and effective face.

17 Claims, 6 Drawing Sheets

(56) References Cited

U.S. PATENT DOCUMENTS

| | | | | |
|---|---|---|---|---|
| 10,928,904 | B1* | 2/2021 | Novelli | G06F 3/013 |
| 2007/0183633 | A1* | 8/2007 | Hoffmann | G06K 9/00221 |
| | | | | 382/116 |
| 2010/0245042 | A1 | 9/2010 | Tsubaki | |
| 2010/0290668 | A1* | 11/2010 | Friedman | G06K 9/00255 |
| | | | | 382/103 |
| 2017/0323167 | A1* | 11/2017 | Mapen | G06K 9/00604 |
| 2019/0147676 | A1* | 5/2019 | Madzhunkov | H04N 5/232 |
| | | | | 340/5.2 |

FOREIGN PATENT DOCUMENTS

| | | |
|---|---|---|
| CN | 102622588 A | 8/2012 |
| CN | 102663361 A | 9/2012 |
| CN | 103077459 A | 5/2013 |
| CN | 104301633 A | 1/2015 |
| CN | 105139006 A | 12/2015 |
| CN | 105243378 A | 1/2016 |
| CN | 105760817 A | 7/2016 |
| CN | 106296112 A | 1/2017 |
| CN | 106709417 A | 5/2017 |
| CN | 107506697 A | 12/2017 |
| WO | 2008021584 A2 | 2/2008 |
| WO | 2016033184 A1 | 3/2016 |

OTHER PUBLICATIONS

First Office Action from China patent office in a counterpart Chinese patent Application 201710634320.6, dated May 30, 2019 (11 pages).
European Search Report, European Application No. 18840418.0, dated Jun. 26, 2020 (8 pages).

\* cited by examiner

ANTI-COUNTERFEITING PROCESSING METHOD, ELECTRONIC DEVICE, AND NON-TRANSITORY COMPUTER-READABLE STORAGE MEDIUM

CROSS-REFERENCE TO RELATED APPLICATION(S)

This application is a continuation application of International Patent Application No. PCT/CN2018/096831, filed on Jul. 24, 2018, which claims priority to Chinese Patent Application No. 201710634320.6, filed on Jul. 29, 2017, the contents of both of which are herein incorporated by reference in their entireties.

TECHNICAL FIELD

The present disclosure relates to the field of electronic devices, and in particular, to an anti-counterfeiting processing method, an electronic device, and a non-transitory computer-readable storage medium.

BACKGROUND

With the widespread use of electronic devices (mobile phones, tablets, and the like), the electronic devices can support more and more applications, and are becoming more and more powerful in functions. The electronic devices are developing towards diversified and personalized way, and becoming indispensable electronic products in users' lives.

At present, multi-biometric recognition is increasingly favored by electronic equipment manufacturers. However, an anti-counterfeiting and a safety of the multi-biometric recognition needs to be improved.

SUMMARY

In some aspects, in some embodiments of the present disclosure, an electronic device may be provided. The electronic device may include: an iris recognition device, configured to acquire an iris image; a face recognition device, configured to acquire a face image, wherein the face image and the iris image are both acquired from a target object; a memory, configured to store a preset condition; and an application processor (AP), connected to the iris recognition device, the face recognition device and the memory; wherein the application processor is configured to determine a positional relationship between the iris image and the face image, perform living body detection according to the iris image, and determine that the target object is a true and effective face in response to the positional relationship satisfying the preset condition and the iris image being from the living body.

In some aspects, in some embodiments of the present disclosure, an anti-counterfeiting processing method may be provided. The method may be applicable to an electronic device. The electronic device may include an application processor (AP), an iris recognition device, a face recognition device, and a memory; the iris recognition device, the face recognition device, and the memory are connected to the AP, the memory may be configured to store a preset condition. The method may include: acquiring, by the iris recognition device, an iris image; acquiring, by the face recognition device, a face image, wherein the face image and the iris image are both acquired from a target object; and determining, by the AP, a positional relationship between the iris image and the face image, performing living body detection according to the iris image, and determining that the target object is a true and effective face in response to the positional relationship satisfying a preset condition and the iris image being from the living body.

In some aspects, in some embodiments of the present disclosure, an anti-counterfeiting processing method may be provided. The method may include: acquiring a face image and an iris image, wherein the face image and the iris image are both acquired from a target object; determining a positional relationship between the iris image and the face image, and performing living body detection according to the iris image; and determining that the target object is a true and effective face in response to the positional relationship satisfying a preset condition and the iris image being from the living body.

In some aspects, in some embodiments of the present disclosure, an anti-counterfeiting processing apparatus may be provided. The apparatus may include: a first acquiring unit, configured to acquire a face image and an iris image, wherein the face image and the iris image are both acquired from a target object; a detecting unit, configured to determine a positional relationship between the iris image and the face image, and perform living body detection according to the iris image; and a first determining unit, configured to determine that the target object is a true and effective face in response to the positional relationship satisfying the preset condition and the iris image being from the living body.

In some aspects, in some embodiments of the present disclosure, an electronic device may be provided. The electronic device may include: an application processor (AP), a memory, and one or more programs; the one or more programs being stored in the memory and configured to be executed by the AP, the one or more programs comprise instructions for performing the method as previously described.

In some aspects, in some embodiments of the present disclosure, a computer-readable storage medium may be provided. The computer-readable storage medium may store a computer program for the electronic data interchange. The computer program causes a computer to perform the method as previously described.

In some aspects, in some embodiments of the present disclosure, a computer program product may be provided. The computer program product may a non-transitory computer-readable storage medium storing a computer program, the computer program may be operable to cause a computer to perform the method as previously described.

BRIEF DESCRIPTION OF DRAWINGS

In order to make the technical solution described in embodiments or background of the present disclosure more clearly, the drawings used for the description of the embodiments or background will be described. Apparently, the drawings in the following description are only some embodiments of the present disclosure. For those skilled in the art, other drawings may be acquired according to the drawings without any creative work.

DETAILED DESCRIPTION

Figure 1A:
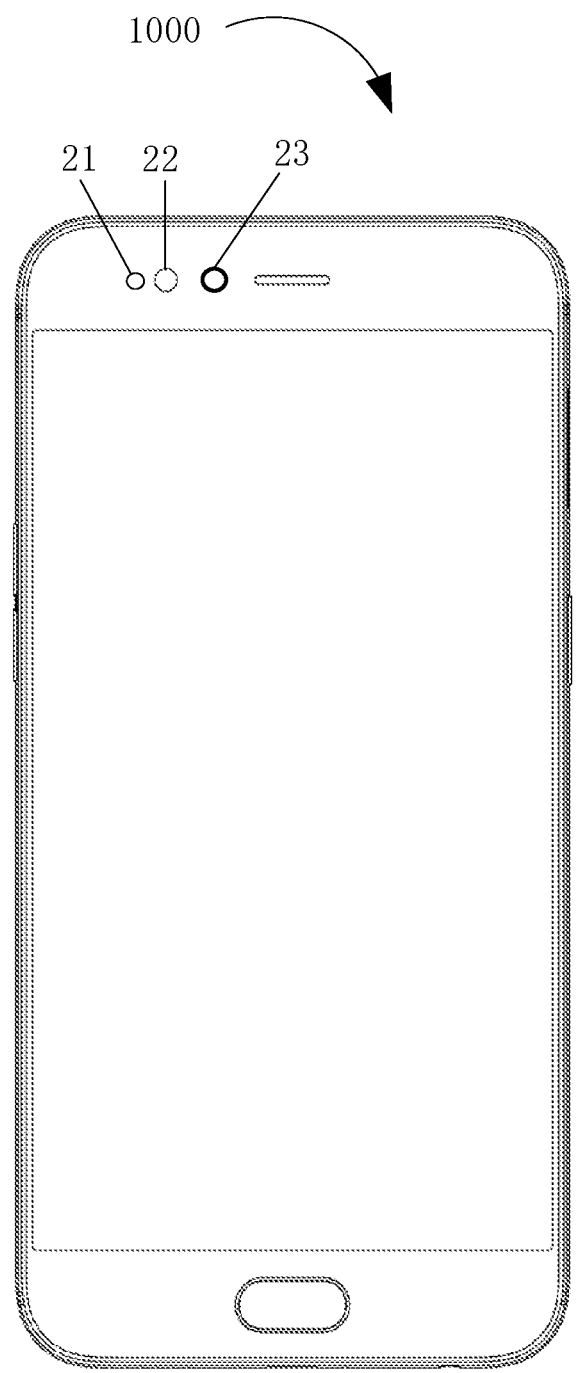
FIG. 1A is a schematic view of an example electronic device according to some embodiments of the present disclosure.

In order to better understand the present disclosure for those skilled in the art, the technical solutions in the embodiments of the present disclosure are clearly and completely described in conjunction with the drawings in the embodiments of the present disclosure. It is obvious that the described embodiments are only a part of the embodiments of the present disclosure, and not all embodiments. All other embodiments acquired by the ordinary skilled in the art based on the embodiments in the present disclosure without the creative work are all within the scope of the present disclosure.

The terms "first", "second", and the like used in the specification and claims of the present disclosure and the above drawings are used to distinguish different objects, and are not intended to describe a specific order. Furthermore, the terms "including" and "having", and any modification thereof are intended to cover un-exclusive inclusion. For example, a process, method, system, product, or device that includes a series of steps or units is not limited to the listed steps or units, but optionally also includes steps or units not listed, or optionally includes other steps or units inherent to these processes, methods, products, or equipment.

"Embodiment" herein means that a particular feature, structure, or characteristic described with reference to embodiments may be included in at least one embodiment of the present disclosure. The term appearing in various places in the specification are not necessarily as shown in the same embodiment, and are not exclusive or alternative embodiments that are mutually exclusive with other embodiments. Those skilled in the art will understand explicitly and implicitly that the embodiments described herein may be combined with other embodiments.

Some embodiments of the present disclosure may relate to electronic devices. The electronic devices may include various kinds of handheld devices, in-vehicle devices, wearable devices, and computing devices having wireless communication functions, or other processing devices connected to wireless modems. The electronic devices may also include various kinds of user equipment (UE), mobile stations (MS), terminal devices, and the like. For convenience of description, the devices mentioned above may be referred to as electronic devices.

It should be noted that, in some embodiments of the present disclosure, the electronic device may be equipped with a multi-biometric recognition device, that is, a plurality of biometric recognition devices. In addition to an iris recognition device and a face recognition device, the plurality of biometric recognition devices may further include at least one of the following: a fingerprint recognition device, a vein recognition device, an electroencephalogram recognition device, an electrocardiogram recognition device, and the like. Each biometric recognition device may have a corresponding recognition algorithm and a corresponding recognition threshold. Besides, each biometric recognition device may have a corresponding template that is pre-recorded by a user. For example, the fingerprint recognition device may have a corresponding template preset fingerprint template. Further, the fingerprint recognition device may capture a fingerprint image. In case that a match value between the fingerprint image and the preset fingerprint template is greater than the corresponding recognition threshold, the recognition is successful. In some embodiments of the present disclosure, an iris image may be an image of a single iris region or an image including an iris region (for example, an image of a human eye). For example, in case that the user is using the electronic device, the iris image may be acquired by the iris recognition device.

Furthermore, in some embodiments of the present disclosure, a multi-biometric recognition mode may include at least two kinds of recognition operations. For example, it is possible to perform fingerprint recognition first, and then perform face recognition after the fingerprint recognition is successful. Or, it may be also possible to perform the fingerprint recognition and the face recognition synchronously. The multi-biometric recognition mode is safer than a single-biometric recognition mode (for example, unlocking may be achieved only by the fingerprint recognition). Thus, the multi-biometric recognition mode is becoming more and more popular.

In some aspects, in some embodiments of the present disclosure, an electronic device may be provided. The electronic device may include: an iris recognition device, configured to acquire an iris image; a face recognition device, configured to acquire a face image, wherein the face image and the iris image are both acquired from a target object; a memory, configured to store a preset condition; and an application processor (AP), connected to the iris recognition device, the face recognition device and the memory; wherein the application processor is configured to determine a positional relationship between the iris image and the face image, perform living body detection according to the iris image, and determine that the target object is a true and effective face in response to the positional relationship satisfying the preset condition and the iris image being from the living body.

In some embodiments, in determining the positional relationship between the iris image and the face image, the AP may be further configured to: determine a center point of the iris image; perform a contour extraction on the face image to acquire a peripheral contour; determine a vertical distance between the center point and the peripheral contour, wherein the vertical distance comprises a first vertical distance and a second vertical distance; and determine a ratio of the first vertical distance to the second vertical distance as the positional relationship between the iris image and the face image.

In some embodiments, in determining the positional relationship between the iris image and the face image, the AP is further configured to: extract a key feature in the face image; and determine a positional relationship between the key feature and the iris image.

In some embodiments, in performing the living body detection according to the iris image, the AP is further configured to: perform a feature extraction on the iris image to acquire P feature points, wherein P is an integer greater than 1; train the P feature points by utilizing a preset classifier to acquire P training values; and select Q training values from the P training values, wherein each of the Q training values has a training value greater than a preset training threshold; determine that the iris image is acquired from the living body in response to a ratio of Q to P being greater than a preset threshold; wherein Q is a positive integer less than P.

In some embodiments, the electronic device includes an ambient light sensor configured to acquire a current brightness of ambient light. The AP is further configured to determine an image enhancement coefficient corresponding to the current brightness of ambient light. In performing the feature extraction on the iris image, the AP is further configured to: perform an image enhancement processing on the iris image according to the image enhancement coefficient, and perform the feature extraction on the iris image after the image enhancement processing In some embodiments, in performing the feature extraction on the iris image, the AP is further configured to: perform a binarization processing on the iris image; smooth the iris image after the binarization processing; and perform the feature extraction on the smoothed iris image.

In some aspects, in some embodiments of the present disclosure, an anti-counterfeiting processing method may be provided. The method may include: acquiring a face image and an iris image, wherein the face image and the iris image are both acquired from a target object; determining a positional relationship between the iris image and the face image, and performing living body detection according to the iris image; and determining that the target object is a true and effective face in response to the positional relationship satisfying a preset condition and the iris image being from the living body.

In some embodiments, the determining the positional relationship between the iris image and the face image may include: determining a center point of the iris image; performing a contour extraction on the face image to acquire a peripheral contour; determining a vertical distance between the center point and the peripheral contour, the vertical distance comprising a first vertical distance and a second vertical distance, and determining a ratio of the first vertical distance to the second vertical distance as the positional relationship between the iris image and the face image.

In some embodiments, the determining the positional relationship between the iris image and the face image may include: extracting a key feature in the face image; and determining a positional relationship between the key feature and the iris image.

In some embodiments, the determining the positional relationship between the key feature and the iris image may include: geometrically selecting a first center point of the key feature and a second center point of the iris image; and determining a distance between the first center point and the second center point as the positional relationship between the key feature and the iris image.

In some embodiments, the performing the living body detection according to the iris image may include: performing a feature extraction on the iris image to acquire P feature points, wherein P is an integer greater than 1; training the P feature points by utilizing a preset classifier to acquire P training values; selecting Q training values from the P training values, wherein each of the Q training values has a training value greater than a preset training threshold; and determining that the iris image is acquired from the living body in response to a ratio of Q to P being greater than a preset threshold; wherein Q is a positive integer less than P.

In some embodiments, the preset classifier is preset by: acquiring a positive sample set, wherein the positive sample set comprises X feature points of a first iris image from a living body, and X is a positive integer; acquiring a negative sample set, wherein the negative sample set comprises Y feature points of a second iris image from a non-living body, and Y is a positive integer; performing a feature extraction on the positive sample set to acquire X groups of features; performing a feature extraction on the negative sample set to acquire Y groups of features; utilizing a first specified classifier to train the X groups of features to a first class target classifier; utilizing a second specified classifier to train the X groups of features to a second class target classifier; and determining the first class target classifier and the second class target classifier as the preset classifier.

In some embodiments, the method may further include: acquiring a current brightness of ambient light, and determining an image enhancement coefficient corresponding to the current brightness of ambient light. The performing the feature extraction on the iris image may include: performing an image enhancement processing on the iris image according to the image enhancement coefficient, and performing the feature extraction on the iris image after the image enhancement processing.

In some embodiments, the performing the feature extraction on the iris image may include: performing a binarization processing on the iris image; smoothing the iris image after the binarization processing; and performing the feature extraction on the smoothed iris image.

In some embodiments, the acquiring the face image and the iris image may include: acquiring the face image in response to an angle of the target object being within a preset angle range; determining, according to the face image, a position of an iris; and acquiring the iris image by capturing the iris according to the position of the iris.

In some embodiments, the method may further include: pre-storing a referenced face image; determining a positional relationship between a face and an iris in the referenced face image; and determining the preset condition according to the positional relationship.

In some embodiments, the acquiring the iris image may include: acquiring a current environment parameter; determining an iris acquisition parameter according to the current environmental parameter; and acquiring the iris image according to the iris acquisition parameter.

In some aspects, in some embodiments of the present disclosure, a computer-readable storage medium may be provided. The computer-readable storage medium may store a computer program for the electronic data interchange. The computer program causes a computer to perform the method as previously described.

In some embodiments, the determining the positional relationship between the iris image and the face image may include: determining a center point of the iris image; performing a contour extraction on the face image to acquire a peripheral contour; determining a vertical distance between the center point and the peripheral contour, the vertical distance comprising a first vertical distance and a second vertical distance, and determining a ratio of the first vertical distance to the second vertical distance as the positional relationship between the iris image and the face image.

In some embodiments, the determining the positional relationship between the iris image and the face image may include: extracting a key feature in the face image; and determining a positional relationship between the key feature and the iris image. The performing the living body detection according to the iris image may include: performing a feature extraction on the iris image to acquire P feature points, wherein P is an integer greater than 1; training the P feature points by utilizing a preset classifier to acquire P training values; and selecting Q training values from the P training values, wherein each of the Q training values has a training value greater than a preset training threshold; determining that the iris image is acquired from the living body in response to a ratio of Q to P being greater than a preset threshold; wherein Q is a positive integer less than P.

The embodiments of the present disclosure may be described in detail below. FIG. 1A shows an example electronic device. The electronic device 1000 may include an iris recognition device. As shown in FIG. 1A, the iris recognition device may include an infrared fill lamp 21 and an infrared camera 22. During the operation of the iris recognition device, light emitted from the infrared fill lamp 21 may be incident on an iris and further reflected by the iris and back to the infrared camera 22. The iris recognition device may capture the iris image. A front camera 23 may be utilized as a face recognition device. The front camera 23 may be a dual camera module.

Figure 1B:
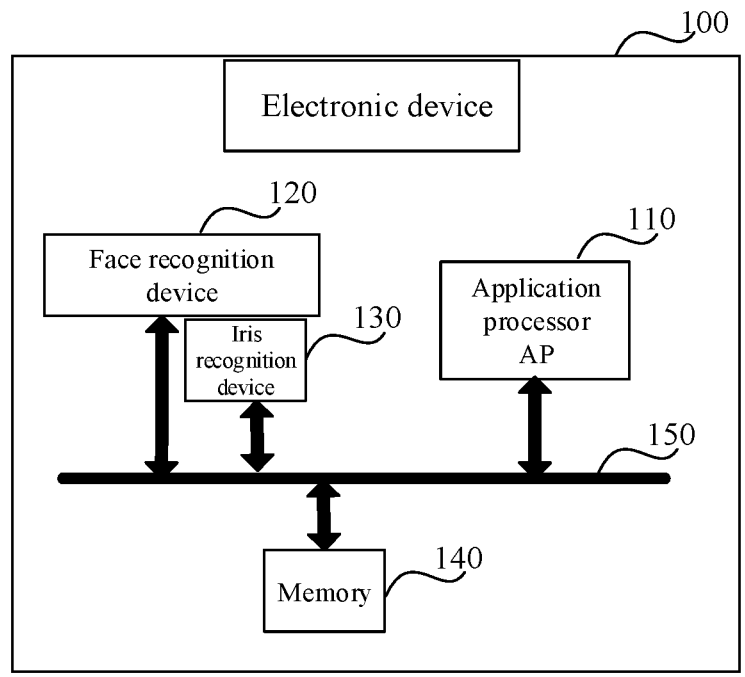
FIG. 1B is a schematic view of an electronic device according to some embodiments of the present disclosure.
Figure 1C:
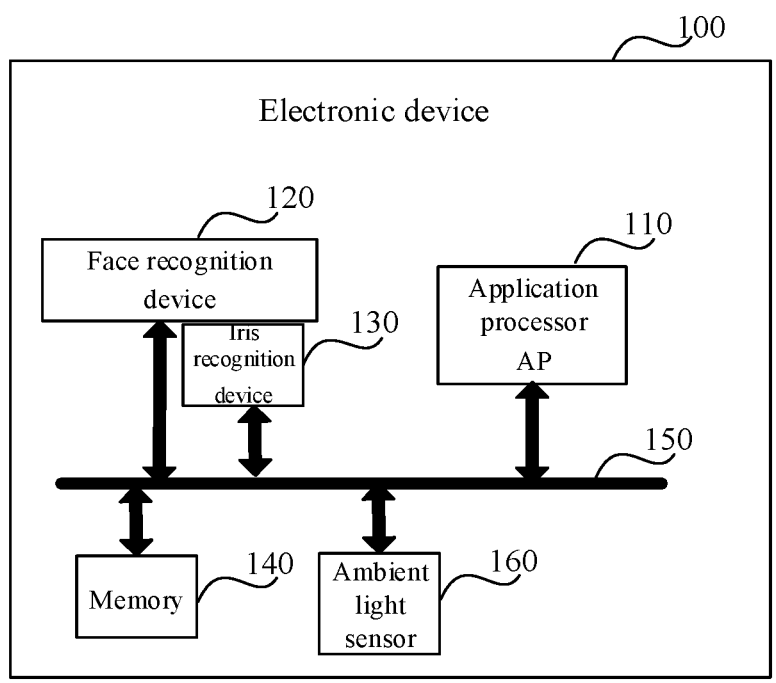
FIG. 1C is a further schematic view of an electronic device according to some embodiments of the present disclosure.

FIG. 1B is another schematic view of an electronic device 100. As shown in FIG. 1B, the electronic device 100 may include: an application processor (AP) 110, a face recognition device 120, an iris recognition device 130, and a memory 140. The device 130 may be integrated with the face recognition device 120, or the iris recognition device 130 and the face recognition device 120 may exist independently. In some embodiments, the AP 110 may be connected to the face recognition device 120, the iris recognition device 130, and the memory 140 through a bus 150. Furthermore, FIG. 1C shows a variant structure of the electronic device 100 shown in FIG. 1B. Compared with FIG. 1B, the electronic device 100 shown in FIG. 1C may further include an ambient light sensor 160.

Based on the electronic device as described in FIGS. 1A-1C, the following operations may be executed.

Optionally, the iris recognition device 130 may be configured to acquire an iris image.

The face recognition device 120 may be configured to acquire a face image. In some embodiments, the face image and the iris image may be both acquired from a target object.

The memory 140 may be configured to store a preset condition.

The AP 110 may be configured to determine a positional relationship between the iris image and the face image, perform living body detection according to the iris image, and determine that the target object is a true and effective face in response to the positional relationship satisfying the preset condition and the iris image being from the living body. Herein, "determine that the target object is a true and effective face" may indicate that, the target object is determined or confirmed as a true and effective face.

Optionally, in terms of the determining the positional relationship between the iris image and the face image, the AP 110 may be specifically configured to execute the following operations.

A center point of the iris image may be determined.

A contour extraction may be performed on the face image to acquire a peripheral contour.

A vertical distance between the center point and the peripheral contour may be determined. The vertical distance may include a first vertical distance and a second vertical distance. A ratio of the first vertical distance to the second vertical distance may be determined as the positional relationship between the iris image and the face image. In some embodiments, "vertical distance between the center point and the peripheral contour may be determined" may refer to a distance between the center point and the peripheral contour in the vertical direction. As shown in FIG. 1E, in some embodiments, the vertical direction may be a direction substantially parallel to a lengthwise direction of the electronic device. In some embodiments, a vertical line may pass through the center point and disposed in the vertical direction, such that a first intersection point and a second intersection point may be generated. Thus, the first vertical distance may be a distance between the first intersection point and the center point, and the second vertical distance may be a distance between the second intersection point and the center point.

Optionally, in terms of the determining the positional relationship between the iris image and the face image, the AP 110 may be further specifically configured to execute the following operations.

A key feature in the face image may be extracted.

A positional relationship between the key feature and the iris image may be determined.

Optionally, in terms of the performing the living body detection according to the iris image, the AP 110 may be further specifically configured to execute the following operations.

A feature extraction may be performed on the iris image to acquire P feature points. In some embodiments, P may be an integer greater than 1.

The P feature points may be trained by utilizing a preset classifier to acquire P training values.

A training value that is greater than a preset training threshold may be selected from the P training values, and thus Q training values may be acquired. That is to say, the Q training values may be selected from the P training values, and each of the Q training values may have a training value greater than the preset training threshold. In response to a ratio of Q to P being greater than a preset threshold, it may be determined that the iris image is acquired from the living body. In some embodiments, Q may be a positive integer less than P.

Optionally, the ambient light sensor 160 may be configured to acquire a current brightness of ambient light.

The AP 110 may be further configured to determine an image enhancement coefficient corresponding to the current brightness of ambient light.

In terms of the performing the feature extraction on the iris image, the AP 110 may be specifically configured to execute the following operations.

An image enhancement processing may be performed on the iris image according to the image enhancement coefficient, and the feature extraction may be performed on the iris image after the image enhancement processing.

Optionally, in terms of the performing the feature extraction on the iris image, the AP 110 is specifically configured to execute the following operations.

A binarization processing may be performed on the iris image.

The iris image may be smoothed after the binarization processing.

The feature extraction may be performed on the smoothed iris image.

The electronic device described in FIG. 1A to FIG. 1C may be configured to perform an anti-counterfeiting processing method in the following. The memory 140 may be configured to store a preset condition. The method may include the following operations.

The iris recognition device 130 may acquire an iris image.

The face recognition device 120 may acquire a face image. In some embodiments, the face image and the iris image may be both acquired from a target object.

The AP 110 may be configured to determine a positional relationship between the iris image and the face image, perform living body detection according to the iris image, and determine that the target object is a true and effective face in response to the positional relationship satisfying the preset condition and the iris image being from the living body.

It may be seen that, in some embodiments of the present disclosure, the face image and the iris image may be acquired, and the face image and the iris image may be both acquired from the target object, the positional relationship between the iris image and the face image may be determined, and the living body detection may be performed according to the iris image. In response to the positional relationship satisfying the preset condition and the iris image being from the living body, it is determined that the target object is a true and effective face. In some embodiments, on one hand, the anti-counterfeiting may be performed according to the positions of the iris image and the face image, and on the other hand, the anti-counterfeiting may be performed by the iris living body detection. In this way, it is possible to improve the safety of the multi-biometric recognition.

Figure 1D:
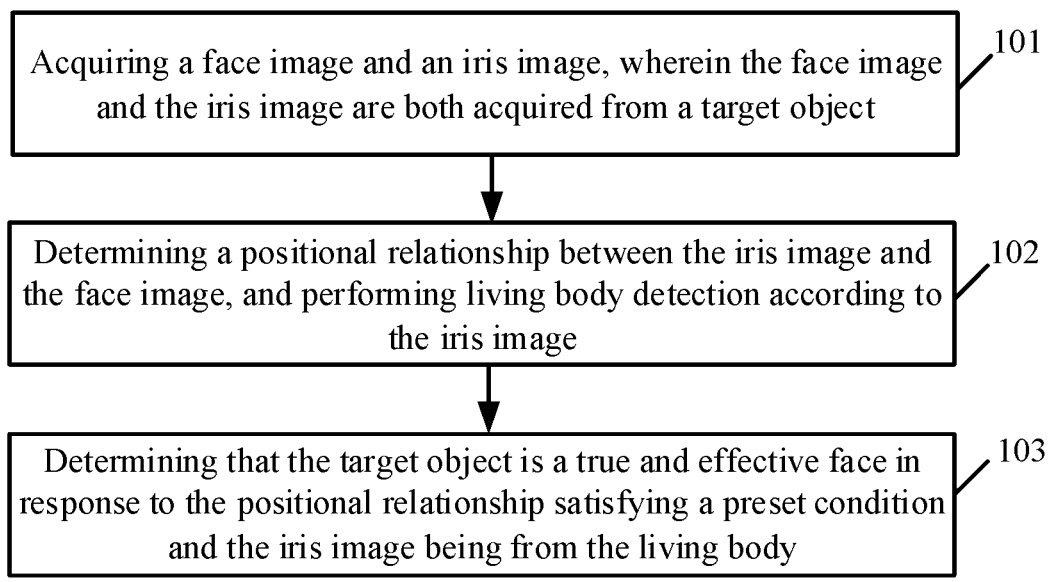
FIG. 1D is a flow chart of an anti-counterfeiting processing method according to some embodiments of the present disclosure.
Figure 1E:
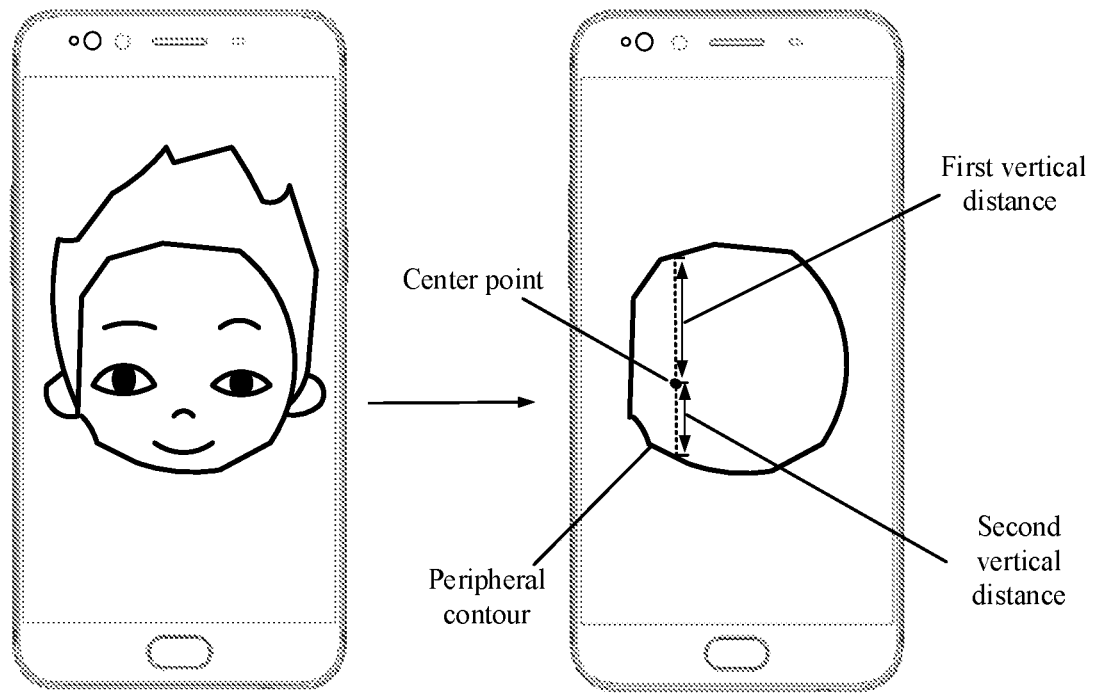
FIG. 1E is a schematic presentation showing a positional relationship between an iris image and a face image according to some embodiments of the present disclosure.

FIG. 1D is a flow chart of an anti-counterfeiting processing method according to some embodiments of the present disclosure. The anti-counterfeiting processing method described in some embodiments may be applied to an electronic device. A pictorial diagram and a structural view of the electronic device may be shown in FIG. 1A to FIG. 1C. The method may include operations executed by the following blocks.

At block 101, a face image and an iris image may be acquired. In some embodiments, the face image and the iris image may be both acquired from a target object.

In some embodiments, the electronic device may control the face recognition device to acquire the face image, and control the iris recognition device to acquire the iris image. Both the face image and the iris image may be acquired from the target object.

Optionally, at the foregoing block 101, the operation of acquiring the face image and the iris image may further include operations executed by the following blocks 11-13. The blocks may specifically include the following.

At block 11, the face image may be acquired in response to an angle of the target object being within a preset angle range.

At block 12, a position of an iris may be determined according to the face image.

At block 13, the iris may be captured according to the position of the iris, and the iris image may be acquired.

The target object may be a face of a user, and the preset angle range may be set by the system default or by the user. In general, a certain angle may exist between the object to be photographed (herein, the target object) and the electronic device. Of course, when the angle is appropriate, the captured face image is also appropriate. It may be understood that, when the angle of the target object is within the preset angle range, the captured face image may be more suitable for face recognition, and it may be easier to capture the iris image. Therefore, in response to the angle of the target object being within the preset angle range, the face image may be acquired. Furthermore, the position of the iris may also be acquired according to the relationship of a structure of the face. The iris recognition device may be controlled to focus on the position of the iris and capture the iris. In this way, the iris image may be acquired.

At block 102, a positional relationship between the iris image and the face image may be determined, and living body detection may be performed according to the iris image.

In some embodiments, since the iris is a part of the human face, there is a certain correlation between the iris and the human face in terms of a spatial structure. Therefore, it is possible to achieve the anti-counterfeiting by utilizing the positional relationship between the iris image and the face image.

Optionally, determining the positional relationship between the iris image and the face image may be performed in parallel with performing the living body detection according to the iris image. For example, it is possible to utilize a process to execute the block of determining the positional relationship between the iris image and the face image, and utilize another process to execute the block of performing the living body detection according to the iris image. For another example, it is possible to utilize a thread to execute the block of determining the positional relationship between the iris image and the face image, and utilize another thread to execute the block of performing the living body detection according to the iris image.

Optionally, in the foregoing block 102, determining the positional relationship between the iris image and the face image may include operations executed by the following blocks A11-A13. The blocks may specifically include the following.

At block A11, a center point of the iris image may be determined.

At block A12, a contour extraction may be performed on the face image to acquire a peripheral contour.

At block A13, a vertical distance between the center point and the peripheral contour may be determined. The vertical distance may include a first vertical distance and a second vertical distance. A ratio of the first vertical distance to the second vertical distance may be determined as the positional relationship between the iris image and the face image.

In some embodiments, the center point of the iris image may be determined geometrically. The center point may be a geometric center point. Furthermore, the contour extraction may be performed on the face image to acquire a peripheral contour, that is, a contour of the face shape. After that, a vertical distance between the center point and the peripheral contour may be determined. The vertical distance may include a first vertical distance and a second vertical distance. A ratio of the first vertical distance to the second vertical distance may be determined as the positional relationship between the iris image and the face image. The positional relationship may be a specific ratio, and the preset condition may be a value range, for example, a first preset range. That is, in response to the ratio of the first vertical distance to the second vertical distance being within the first preset range, it may be considered that the positional relationship between the iris image and the face image satisfies the preset condition. As shown in FIG. 1E, a face image is disposed at a left side, and the face image may include an iris image. At a right side, a center point may be acquired according to the iris image, and a peripheral contour (in a contour extraction mode) may be acquired from the face image. Furthermore, the vertical distance (that is, the first vertical distance and the second vertical distance) may be determined based on the center point. The ratio of the first vertical distance to the second vertical distance may serve or be determined as the positional relationship between the iris image and the face image.

Optionally, in the foregoing block 102, determining the positional relationship between the iris image and the face image may include the following blocks A21-A22. The blocks may specifically include the following.

At block A21, a key feature in the face image may be extracted.

At block A22, a positional relationship between the key feature and the iris image may be determined.

In some embodiments, the key feature described above may include at least one of the following: a nevus, a scar, a freckle, five-sense organs, and the like on the human face. For example, the positional relationship between the face image and the iris image may be determined according to the relationship between the key feature and the iris image. For example, in case that the key feature is a nevus, an angle between the nevus and the two eyes (iris) may be determined as the positional relationship between the face image and the iris image. The positional relationship may be a specific ratio, and the preset condition may be a value range, for example, a second preset range. That is, in response to the ratio of the first vertical distance to the second vertical distance being within the second preset range, it may be considered that the positional relationship between the iris image and the face image satisfies the preset condition.

Furthermore, in the foregoing block A22, determining the positional relationship between the key feature and the iris image may include operations executed by the following blocks.

At block A221, a first center point of the key feature and a second center point of the iris image may be selected.

At block A222, the positional relationship between the iris image and the face image may be determined according to the first center point and the second center point.

In some embodiments, the first center point of the key feature and the second center point of the iris image may be acquired geometrically. The positional relationship between the iris image and the face image may be further determined according to the first center point and the second center point. For example, a distance between the first center point and the second center point may be determined as the positional relationship between the iris image and the face image.

Optionally, in the foregoing block 102, performing the living body detection according to the iris image may include operations executed by the following blocks 21-23. The blocks may include the following.

At block 21, a feature extraction may be performed on the iris image to acquire P feature points. In some embodiments, P may be an integer greater than 1.

At block 22, the P feature points may be trained by utilizing a preset classifier to acquire P training values.

At block 23, a training value that is greater than a preset training threshold may be selected from the P training values, and thus Q training values may be acquired. That is to say, the Q training values may be selected from the P training values, and each of the Q training values may have a training value greater than the preset training threshold. It may be determined that that the iris image is acquired from the living body in response to a ratio of Q to P being greater than a preset threshold. In some embodiments, Q may be a positive integer less than P.

The electronic device may perform the feature extraction on the iris image to acquire the P feature points, and P is an integer greater than 1. The feature extraction may be implemented by the following algorithm: Harris corner detection algorithm, scale invariant feature transform (SIFT) algorithm, SUSAN corner detection algorithm, and the like. The algorithm for implementing the feature extraction will not be described in details here. The preset classifier may include, but be not limited to: a Support Vector Machine (SVM), a genetic algorithm classifier, a neural network algorithm classifier, a cascade classifier (for example, the genetic algorithms and the SVM classifier), and the like. The P feature points may be trained by utilizing the preset classifier to acquire the P training values. A training value that is greater than a preset training threshold may be selected from the P training values, and thus the Q training values may be acquired. It is determined that the iris image is acquired from the living body in response to the ratio of Q to P being greater than the preset threshold. In some embodiments, Q may be a positive integer less than P. The preset training threshold and the preset threshold may be set by the user, or the system defaults.

In some embodiments, the preset classifier may be set before the foregoing embodiments of the present disclosure are executed. The setting of the preset classifier may include operations executed by the following blocks B1-B7.

At block B1, a positive sample set may be acquired. In some embodiments, the positive sample set may include X feature points of the iris image from the living body, wherein X is a positive integer.

At block B2, a negative sample set may be acquired. In some embodiments, the negative sample set may include Y feature points of the iris image from a non-living body, wherein Y is a positive integer.

At block B3, a feature extraction may be performed on the positive sample set to acquire X groups of features.

At block B4, a feature extraction may be performed on the negative sample set to acquire Y groups of features.

At block B5, a first specified classifier may be utilized to train the X groups of features, and thus a first class target classifier may be acquired.

At block B6, a second specified classifier may be utilized to train the Y groups of features, and thus a second class target classifier may be acquired.

At block B7, the first class target classifier and the second class target classifier may be determined as the preset classifier.

In some embodiments, X and Y may be set by the user. The greater the values of X and Y, the better the classification effect of the classifier. The specific manner of the feature extraction in the foregoing blocks B3 and B4 may refer to the description of the feature extraction described above. In addition, the first specified classifier and the second specified classifier may be the same classifier or different classifiers. The first specified classifier or the second specified classifier may include, but be not limited to, the SVM, the genetic algorithm classifier, the neural network algorithm classifier, the cascade classifier (for example, the genetic algorithms and the SVM classifier), and the like.

Optionally, the electronic device may further include an ambient light sensor. The ambient light sensor may be configured to acquire a current brightness of ambient light. The electronic device may further configured to determine an image enhancement coefficient corresponding to the current brightness of ambient light. In the foregoing block 21, the performing the feature extraction on the iris image may be implemented according to the following operations.

An image enhancement processing may be performed on the iris image according to the image enhancement coefficient, and the feature extraction may be performed on the iris image after the image enhancement processing.

In some embodiments, the electronic device may pre-store a mapping relationship between the brightness and the image enhancement coefficient. In this way, the electronic device may acquire the current brightness of ambient light through the ambient light sensor, determine the image enhancement coefficient corresponding to the current brightness of ambient light according to the mapping relationship, perform the image enhancement processing on the iris image according to the image enhancement coefficient, and perform the feature extraction on the iris image after the image enhancement processing. The image enhancement coefficient may be understood as a degree parameter of the image enhancement processing on an image. For example, gray-scale stretching corresponds to a stretching coefficient, wavelet transform corresponds to a wavelet coefficient, histogram equalization also corresponds to a stretching coefficient, and the like.

Optionally, in the foregoing block 21, performing the feature extraction on the iris image may include operations executed by the following blocks 211-213. The blocks may include the following.

At block 211, a binarization processing may be performed on the iris image.

At block 212, the iris image may be smoothed after the binarization processing.

At block 213, the feature extraction may be performed on the smoothed iris image.

In some embodiments, the electronic device may perform the binarization processing on the iris image, such that image complexity may be reduced. The electronic device may further smooth the iris image, and the feature extraction may be performed on the iris image after the smoothing process.

At block 103, it may be determined that the target object is a true and effective face in response to the positional relationship satisfying the preset condition and the iris image being from the living body.

In some embodiments, only when the positional relationship satisfies the preset condition and the iris image is from the living body, will the target object be determined to be a true and effective face. Herein, the true and effective face may be considered as a human face with a vital sign, not a photo, or a plastic model.

Optionally, it is determined that the target object is not a true and effective face, in response to the positional relationship failing to satisfy the preset condition or the iris image being not from a living body.

By way of example, there may be a fake face (for example, a plastic model) or a fake iris (for example, an iris photo). Therefore, by utilizing the embodiments of the present disclosure, it is possible to pre-store a referenced face image in the electronic device, determine a positional relationship between the face and an iris in the referenced face image, and determine the preset condition according to the positional relationship. In this way, after the face image and the iris image of the target object are captured, on one hand, the positional relationship between the face image and the iris image may be determined, on the other hand, the living body detection may be performed by the iris image. In response to the positional relationship between the face image and the iris image satisfying the preset condition and the iris being from the living body, it indicates that the target object is a true and effective face. In this way, it is possible to perform the living body detection, and perform the anti-counterfeiting detection on the human face to a certain extent, and thus the anti-counterfeiting precision may be improved. In some specific implementations, since the iris is also a part of the human face, it is convenient to acquire the positions of the iris and the human face and process the image. Thus, the algorithm complexity may be reduced to some extent. Of course, even though an illegal person wears a mask or manufacture an artificial iris, the recognition will be difficult to succeed. In this way, it is possible to improve the safety of the multi-biometrics recognition.

It may be seen that, in some embodiments of the present disclosure, the face image and the iris image may be acquired, and the face image and the iris image may be both acquired from the target object, the positional relationship between the iris image and the face image may be determined, and the living body detection may be performed according to the iris image. It is determined that the target object is a true and effective face, in response to the positional relationship satisfying the preset condition and the iris image being from the living body. In some embodiments, on one hand, the anti-counterfeiting may be performed according to the positions of the iris image and the face image, and on the other hand, the anti-counterfeiting may be performed by the iris living body detection. In this way, it is possible to improve the safety of the multi-biometric recognition.

Figure 2:
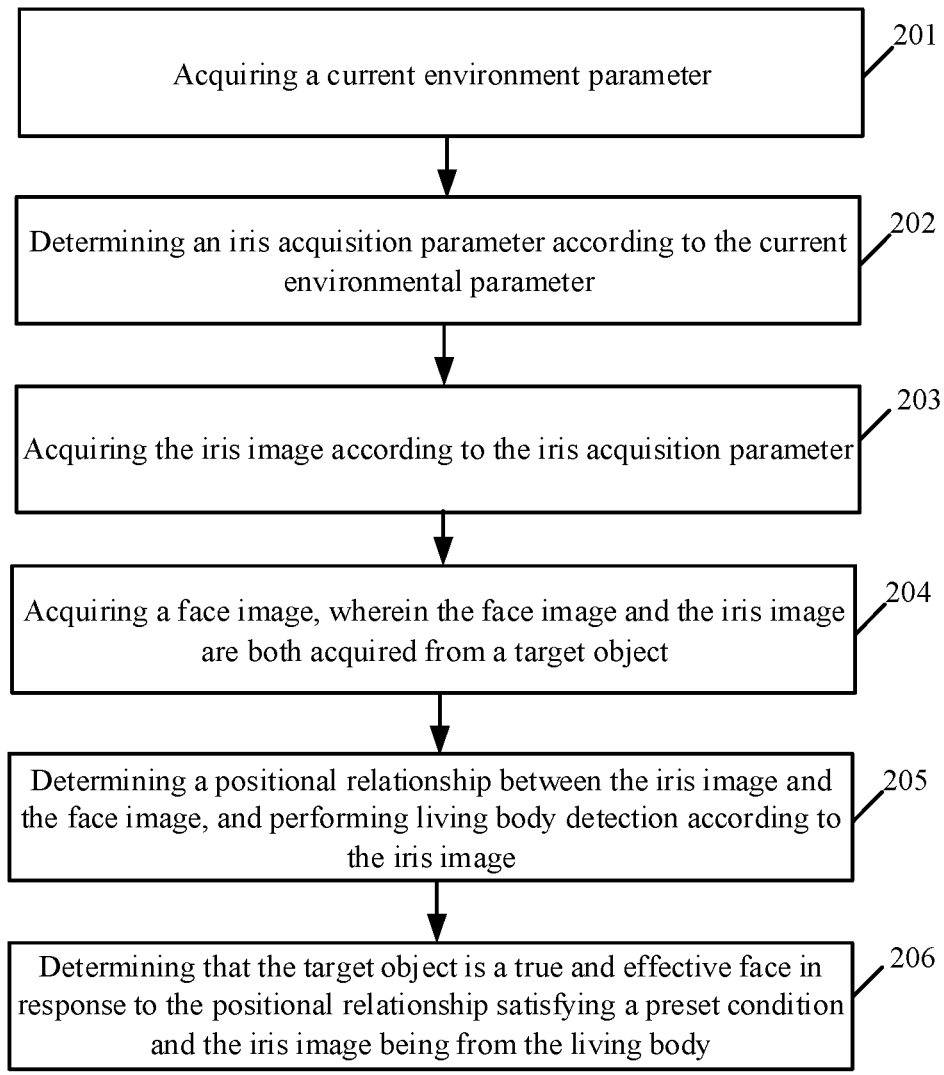
FIG. 2 is a flow chart of another anti-counterfeiting processing method according to some embodiments of the present disclosure.

FIG. 2 is a flow chart of another anti-counterfeiting processing method according to some embodiments of the present disclosure. The anti-counterfeiting processing method described in some embodiments may be applied to an electronic device. A pictorial diagram and a structural view of the electronic device may be seen in FIG. 1A to FIG. 1C. The method may include operations executed by the following blocks.

At block 201, a current environment parameter may be acquired.

The environmental parameter may include at least one of the following: ambient brightness, weather, humidity, temperature, magnetic field interference intensity, environmental color, and the like. For example, an environment parameter may be acquired in response to triggering an unlock operation. The ambient brightness may be detected by the ambient light sensor, the weather may be acquired by a weather application (APP), the magnetic field interference intensity may be detected by a magnetic field detecting sensor, and the environment color may be acquired by a camera.

At block 202, an iris acquisition parameter may be determined according to the current environmental parameter.

A mapping relationship between the environment parameter and the iris capturing parameter may be pre-stored in the electronic device. The electronic device may determine the iris capturing parameter corresponding to the current environment parameter according to the mapping relationship. The iris capturing parameter may include at least one of the following: an acquisition voltage, an acquisition current, an acquisition power, a fill light intensity, a focus time, whether zooming is needed, an aperture size, an exposure duration, and the like.

At block 203, an iris image may be acquired according to the iris acquisition parameter.

In some embodiments, the electronic device may perform iris acquisition according to the iris acquisition parameter, to acquire the iris image. Of course, the acquired iris image may have a higher quality, since the iris image may be optimized according to the specific environment.

At block 204, a face image may be acquired. In some embodiments, the iris image and the face image may be both acquired from the same target object.

At block 205, a positional relationship between the iris image and the face image may be determined, and living body detection may be performed according to the iris image.

At block 206, it is determined that the target object is a true and effective face, in response to the positional relationship satisfying a preset condition and the iris image being from a living body.

In some embodiments, detailed description of the foregoing blocks 204-206 may refer to the corresponding blocks of the anti-counterfeiting processing method described in FIG. 1D. Details will not be described herein again.

It may be seen that, in some embodiments of the present disclosure, the current environment parameter is acquired, the iris acquisition parameter may be determined according to the current environmental parameter, the iris image may be acquired according to the iris acquisition parameter, and the face image may be acquired as a result. The face image and the iris image may be both acquired from the target object. The positional relationship between the iris image and the face image may be determined, and the living body detection may be performed according to the iris image. It is determined that the target object is a true and effective face, in response to the positional relationship satisfying the preset condition and the iris image being from the living body. In some embodiments, on the one hand, the anti-counterfeiting may be performed according to the positions of the iris image and the face image, and on the other hand, the anti-counterfeiting may be performed by the iris living body detection. In this way, it is possible to improve the safety of the multi-biometric recognition.

Figure 3:
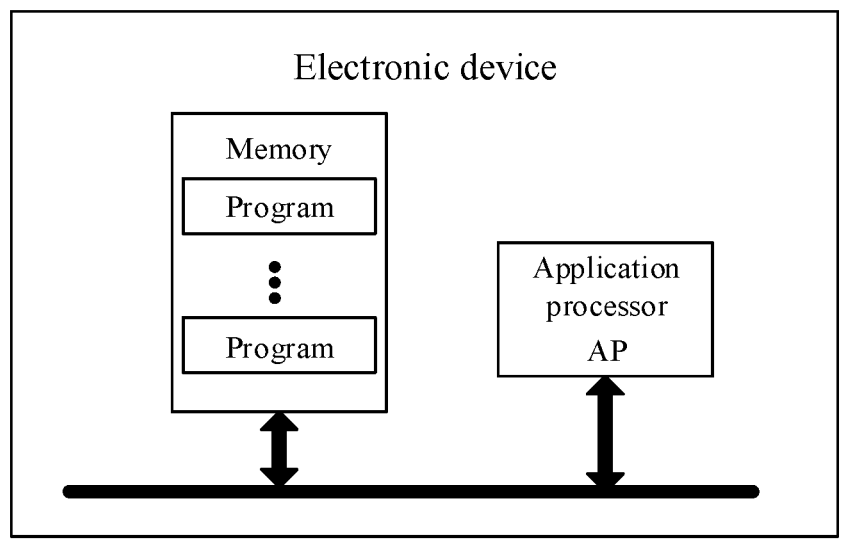
FIG. 3 is a further schematic view of an electronic device according to some embodiments of the present disclosure.

FIG. 3 is a further schematic view of an electronic device according to some embodiments of the present disclosure. The electronic device may include: an application processor (AP), a non-transitory memory, and one or more programs. In some embodiments, the one or more programs may be stored in the non-transitory memory, and configured to be executed by the AP. The one or more programs may include instructions for performing the following operations.

A face image and an iris image may be acquired. In some embodiments, the face image and the iris image may be both acquired from a target object.

A positional relationship between the iris image and the face image may be determined, and living body detection may be performed according to the iris image.

It is determined that the target object is a true and effective face, in response to the positional relationship satisfying a preset condition and the iris image being from the living body.

In some possible examples, in terms of the determining the positional relationship between the iris image and the face image, the program may further include instructions for performing the following operations.

A center point of the iris image may be determined.

A contour extraction may be performed on the face image to acquire a peripheral contour.

A vertical distance between the center point and the peripheral contour may be determined, and a ratio of the first vertical distance to the second vertical distance may be determined as the positional relationship.

In some possible examples, in terms of the determining the positional relationship between the iris image and the face image, the program may further include instructions for performing the following operations.

A key feature in the face image may be extracted.

A positional relationship between the key feature and the iris image may be determined.

In some possible examples, in terms of the performing the living body detection according to the iris image, the program may further include instructions for performing the following operations.

A feature extraction may be performed on the iris image to acquire P feature points. In some embodiments, P may be an integer greater than 1.

The P feature points may be trained by utilizing a preset classifier to acquire P training values.

A training value that is greater than a preset training threshold may be selected from the P training values, and thus Q training values may be acquired. That is to say, the Q training values may be selected from the P training values, and each of the Q training values may have a training value greater than the preset training threshold. It may be determined that the iris image is acquired from the living body in response to a ratio of Q to P being greater than a preset threshold. In some embodiments, Q may be a positive integer less than P.

In some possible examples, the program may include instructions for performing the following operations.

A current brightness of ambient light may be acquired. An image enhancement coefficient corresponding to the current brightness of ambient light may be determined.

In terms of the performing the feature extraction on the iris image, the program may further include instructions for performing the following operations.

An image enhancement processing may be performed on the iris image according to the image enhancement coefficient, and the feature extraction may be performed on the iris image after the image enhancement processing.

In some possible examples, in terms of the performing the feature extraction on the iris image, the program may further include instructions for performing the following operations.

A binarization processing may be performed on the iris image.

The iris image may be smoothed after the binarization processing.

The feature extraction may be performed on the smoothed iris image.

Figure 4A:
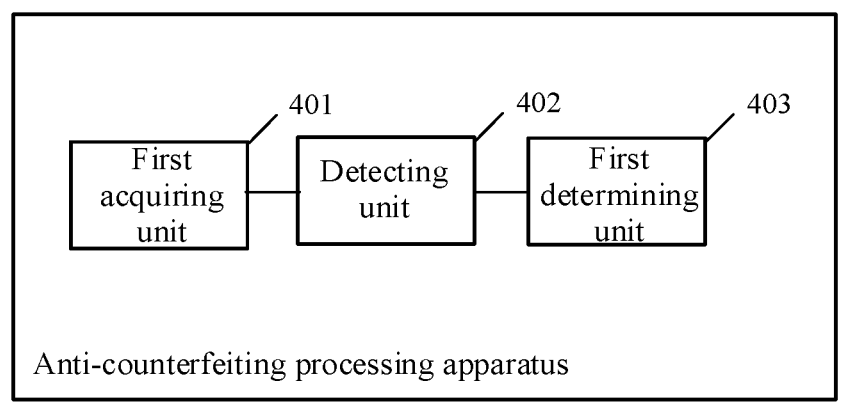
FIG. 4A is a schematic view of an anti-counterfeiting processing apparatus according to some embodiments of the present disclosure.

FIG. 4A is a schematic view of an anti-counterfeiting processing apparatus according to some embodiments of the present disclosure. The anti-counterfeiting processing apparatus may be applied to an electronic device. The anti-counterfeiting processing apparatus may include a first acquiring unit 401, a detecting unit 402, and a first determining unit 403.

In some embodiments, the first acquiring unit 401 may be configured to acquire a face image and an iris image. In some embodiments, the face image and the iris image may be both acquired from a target object.

The detecting unit 402 may be configured to determine a positional relationship between the iris image and the face image, and perform living body detection according to the iris image.

The first determining unit 403 may be configured to determine that the target object is a true and effective face in response to the positional relationship satisfying the preset condition and the iris image being from the living body.

Optionally, the detecting unit 402 may determine the positional relationship between the iris image and the face image in the implementation manners as follow.

A center point of the iris image may be determined.

A contour extraction may be performed on the face image to acquire a peripheral contour.

A vertical distance between the center point and the peripheral contour may be determined. The vertical distance may include a first vertical distance and a second vertical distance. A ratio of the first vertical distance and the second vertical distance may be determined as the positional relationship between the iris image and the face image.

Optionally, the detecting unit 402 may determine the positional relationship between the iris image and the face image in the implementation manners as follow.

A key feature in the face image may be extracted.

A positional relationship between the key feature and the iris image may be determined.

Optionally, the detecting unit 402 may perform the living body detection according to the iris image in the implementation manners as follow.

A feature extraction may be performed on the iris image to acquire P feature points. In some embodiments, P may be an integer greater than 1.

The P feature points may be trained by utilizing a preset classifier to acquire P training values.

A training value that is greater than a preset training threshold may be selected from the P training values, and thus Q training values may be acquired. That is to say, the Q training values may be selected from the P training values, and each of the Q training values may have a training value greater than the preset training threshold. It is determined that the iris image is acquired from the living body in response to a ratio of Q to P being greater than a preset threshold. In some embodiments, Q may be a positive integer less than P.

Figure 4B:
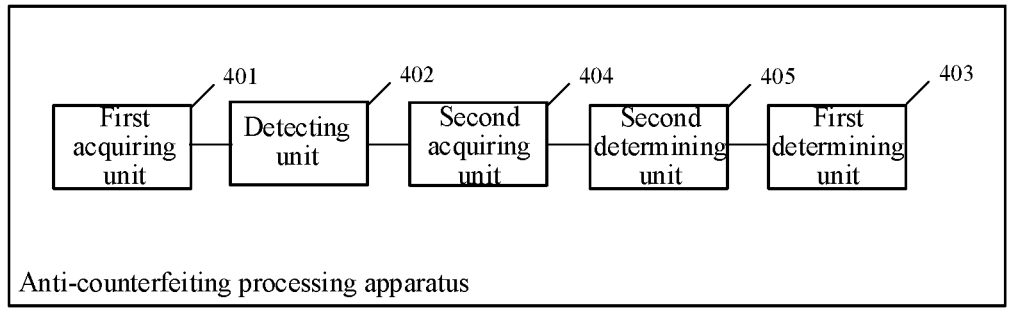
FIG. 4B is another schematic view of an anti-counterfeiting processing apparatus according to some embodiments of the present disclosure.

Optionally, as shown in FIG. 4B, FIG. 4B is a variant structure of the anti-counterfeiting processing apparatus as described in FIG. 4A. Compared with the anti-counterfeiting processing apparatus in FIG. 4A, the anti-counterfeiting processing apparatus in FIG. 4B may further include a second acquiring unit 404 and a second determining unit 405.

The second acquiring unit 404 may be configured to acquire a current brightness of ambient light.

The second determining unit 405 may be configured to determine an image enhancement coefficient corresponding to the current brightness of ambient light. The detecting unit 402 may be configured to perform an image enhancement processing on the iris image according to the image enhancement coefficient, and perform the feature extraction on the iris image after the image enhancement processing.

Optionally, the detecting unit 402 may perform the feature extraction on the iris image in the implementation manners as follow.

A binarization processing may be performed on the iris image.

The iris image may be smoothed after the binarization processing.

The feature extraction may be performed on the smoothed iris image.

It may be seen that, in the anti-counterfeiting processing apparatus described in some embodiments of the present disclosure, the face image and the iris image may be acquired, and the face image and the iris image may be both acquired from the target object. The positional relationship between the iris image and the face image may be determined, and the living body detection may be performed according to the iris image. It is determined that the target object is a true and effective face, in response to the positional relationship satisfying the preset condition and the iris image being from the living body. In some embodiments, on one hand, the anti-counterfeiting may be performed according to the positions of the iris image and the face image, and on the other hand, the anti-counterfeiting may be performed by the iris living body detection. In this way, it is possible to improve the safety of the multi-biometric recognition.

It should be understood that, the functions of the program modules of the anti-counterfeiting processing apparatus in some embodiments may be implemented according to the method in the foregoing method embodiments. The specific implementation processes may refer to the related description of the foregoing method embodiments, and details will not be described herein.

Figure 5:
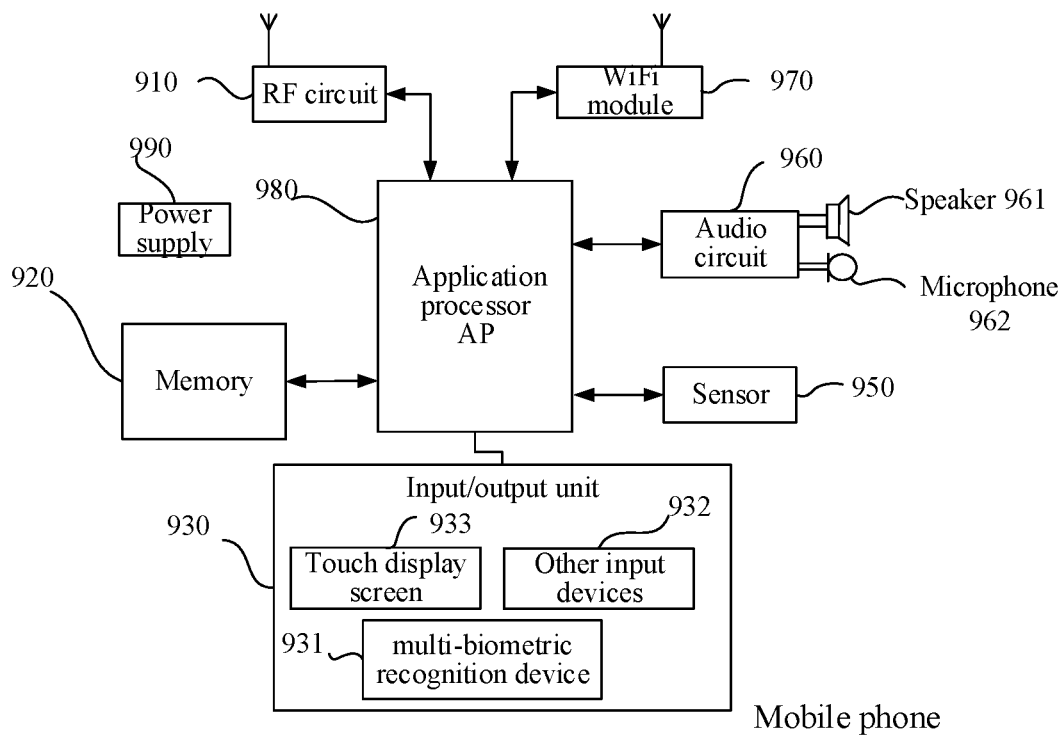
FIG. 5 is a schematic view of an electronic device according to some embodiments of the present disclosure.

Another electronic device may be further provided in some embodiments of the present disclosure. As shown in FIG. 5, for the convenience of description, only parts related to the embodiments of the present disclosure may be shown. Specific technical details not disclosed herein may refer to the method of the embodiments of the present disclosure. The electronic device may be any terminal device including a mobile phone, a tablet computer, a Personal Digital Assistant (PDA), a Point of Sales (POS), an in-vehicle computer, and the like. The electronic device may be configured as a mobile phone as an example.

FIG. 5 is a block diagram showing a partial structure of a mobile phone related to an electronic device provided in some embodiments of the present disclosure. As shown in FIG. 5, the mobile phone may include: a radio frequency (RF) circuit 910, a memory 920, an input unit 930, a sensor 950, an audio circuit 960, wireless fidelity (WiFi) module 970, an application processor (AP) 980, a power supply 990, and other components. It will be understood by those skilled in the art that the structure of the mobile phone as shown in FIG. 5 does not constitute a limitation to the mobile phone, and may include more or less components than those illustrated, or some components may be combined, or different component may be arranged.

The components of the mobile phone will be described in detail with reference to FIG. 5 in the following.

The input unit 930 may be configured to receive input digital or character information and generate a key signal input associated with user setting and functional control of the mobile phone. More specifically, the input unit 930 may include a touch display screen 933, a multi-biometric recognition device 931, and other input devices 932. The structure of the multi-biometric recognition device 931 may refer to the above description, and will not be described here. The input unit 930 may also include the other input devices 932. More specifically, the other input devices 932 may include, but be not limited to, one or more of a physical keyboard, a functional key (such as a volume control key, a switch key, and the like), a track ball, a mouse, an operating rod, and the like.

The AP 980 may be configured to perform the following operations.

A face image and an iris image may be acquired, and the face image and the iris image may be both acquired from a target object.

A positional relationship between the iris image and the face image may be determined, and living body detection may be performed according to the iris image.

It may be determined that the target object is a true and effective face, in response to the positional relationship satisfying the preset condition and the iris image being from the living body.

The AP 980 may be a control center of the mobile phone. The AP 980 may be connected to all parts of the mobile phone by utilizing various interfaces and lines and execute various functions and processing data of the mobile phone by running or executing the software program and/or the module stored in the memory and calling data stored in the memory 920. Thus, the mobile phone may be wholly monitored. Optionally, the AP 980 may include one or more processing units. The AP 980 may be an artificial intelligence chip or a quantum chip. Optionally, the AP 980 may be integrated with an application processor and a modulation-demodulation processor. The application processor may mainly process an operation system, a user interface, an application program, and the like. The modulation-demodulation processor may mainly process wireless communication. It will be appreciated that the above described modulation-demodulation processor may also not be integrated into the AP 980.

In addition, the memory 920 may include a high-speed random access memory, and may further include a non-volatile memory such as at least one of a disk storage device, a flash device, or other volatile solid storage devices.

The RF circuit 910 may be configured to receive and emit information. In general, the RF circuit may include, but be not limited to, an antenna, at least one amplifier, a transceiver, a coupler, a Low Noise Amplifier (LNA), a duplexer, and the like. In addition, the RF circuit 910 may further communicate with other devices via wireless communication and a network. The above wireless communication may use any communication standard or protocol including but being not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The mobile phone may also include at least one type of sensor 950, such as a light sensor, a motion sensor, and other sensors. More specifically, the light sensor may include an ambient light sensor and a proximity sensor. In some embodiments, the ambient light sensor may be configured to adjust the brightness of a touch display screen according to the brightness of the ambient light. The proximity sensor may be configured to turn off the touch display screen and/or backlight in response to the mobile phone being moved to the ear. As a motion sensor, the accelerometer sensor may detect a magnitude of acceleration in all directions (usually three axes). When it is stationary, the accelerometer sensor may detect the magnitude and the direction of gravity, and can be configured to identify an applied gesture of the mobile phone (such as horizontal and vertical screen switching, related games, magnetometer attitude calibration), vibration recognition related functions (such as pedometer, tapping), and the like. Other sensors such as gyroscopes, barometers, hygrometers, thermometers, infrared sensors, and the like, may be configured on the mobile phone. These will no longer be described herein.

An audio circuit 960, a speaker 961, and a microphone 962 may provide an audio interface between the user and the mobile phone. The audio circuit 960 may convert received audio data into an electrical signal and then transmit the electrical signal to the speaker 961. The speaker 961 may then convert the electrical signal into a sound signal. On the other hand, the microphone 962 may convert a captured sound signal into an electrical signal. The audio circuit 960 may receive the electrical signal and then convert the electrical signal into audio data. The AP 980 may process the audio data and then transmit the audio data to another mobile phone via the RF circuit 910, or transmit the audio data to the memory 920 for further processing.

Wi-Fi belongs to a short-range wireless transmission technology. The mobile phone may assist the user to receive and send e-mails, browse Webpages, access to streaming media and the like by means of the Wi-Fi module 970. The Wi-Fi may provide a wireless wideband internet access for the user. Although the Wi-Fi module 970 is illustrated in FIG. 5, it may be understood that, the Wi-Fi module 970 may be optional components of the mobile phone and may be totally omitted without changing the essence of the present disclosure as claimed.

The mobile phone may also include the power supply 990 (such as a battery) that supplies power to the various components. Optionally, the power supply may be logically coupled to the AP 980 through a power management system to manage functions such as charging, discharging, and power management through the power management system.

Although not shown here, the mobile phone may further include a camera, a Bluetooth module, and the like. These will not be described in detail herein again.

In the foregoing embodiments shown in FIG. 1D or FIG. 2, each action/operation of the method may be implemented based on the structure of the mobile phone.

In the foregoing embodiments shown in FIG. 3 and FIG. 4A to FIG. 4B, each unit function may be implemented based on the structure of the mobile phone.

A non-transitory computer storage medium may be further provided in embodiments of the present disclosure. The non-transitory computer storage medium may be configured to store computer programs for electronic data exchange. The non-transitory computer programs may cause a computer to perform some or all of the operations of any anti-counterfeiting processing method described in the foregoing embodiments.

A computer program product may be further provided in some embodiments of the present disclosure. The computer program product may include a non-transitory computer-readable storage medium storing a computer program. The computer programs may be operable to cause a computer to perform some or all of the operations of any anti-counterfeiting processing method described in the foregoing embodiments.

It should be noted that, for the foregoing method embodiments, for the sake of brevity, the method embodiments are all described as a combination of a series of actions. However, those skilled in the art should understand that the present disclosure is not limited by the action sequence described here. It is because that certain blocks may be performed in other sequences or simultaneously in accordance with the present disclosure. Then, those skilled in the art should also understand that the embodiments described in the specification are all optional embodiments, and the actions and modules involved are not necessarily required by the present disclosure.

In the above embodiments, the descriptions of the various embodiments are all have particular focuses. The parts that are not detailed in a certain embodiment may refer to the related descriptions of other embodiments.

In several embodiments provided herein, it should be understood that the disclosed apparatus may be implemented in other ways. For example, the device embodiments described above are merely illustrative. For example, the division of the above units is only a logical function division. In actual implementation, there may be another division manner. For example, multiple units or components may be combined or integrated into another system, or some features can be ignored or not executed. In addition, the mutual coupling or direct coupling or communication connection shown or discussed may be an indirect coupling or communication connection through some interfaces, devices or units, and may be electrical or in other forms.

The units described above as separate components may or may not be physically separated, and the components illustrated as units may or may not be physical units. The units may be located in one place, or may be distributed to multiple network units. Some or all of the units may be selected according to actual needs to achieve the purpose of a solution of the embodiments.

In addition, each functional unit in each embodiment of the present disclosure may be integrated into one processing unit, or each unit may exist physically separately. Optionally, two or more units may also be integrated into one unit. The above integrated unit can be implemented in the form of hardware or in the form of a software functional module.

The above-described integrated unit may be stored in a computer-readable memory if the integrated unit is implemented in the form of a software functional module and sold or used as a standalone product. Based on such understanding, the technical solution of the present disclosure, in essence or the contribution to the prior art, or all or part of the technical solution may be embodied in the form of a software product. The software product may be stored in a memory. The software product may include a number of instructions causing a computer device (the computer device may be a personal computer, a server or a network device, and the like) to perform all or parts of the operations of the above-described methods of various embodiments of the present disclosure. The foregoing memory may include various media which are able to store program codes. The media may include a U disk, a Read-Only Memory (ROM), a Random Access Memory (RAM), a removable hard disk, a magnetic disk, an optical disk, and the like.

Those skilled in the art may understand that all or part of the various methods of the above embodiments may be completed by related hardware instructed by a program. The program may be stored in a computer-readable memory. The memory may include a flash drive, a ROM, a RAM, a magnetic disk, an optical disk, and the like.

The embodiments of the present disclosure have been described in detail above. The principles and implementations of the present disclosure are described in the specific examples. The description of the above embodiments is only used to help understanding the methods of the present disclosure and the core ideas. For those skilled in the art, there will have a change in the specific embodiments and the application scope of present disclosure according to the idea of the present disclosure. In summary, the content of the present specification should not be construed as limiting the present disclosure.

What is claimed is:

1. An electronic device, comprising:
    an iris recognition device, configured to acquire an iris image;
    a face recognition device, configured to acquire a face image, wherein the face image and the iris image are both acquired from a target object;
    a memory, configured to store a preset condition; and
    an application processor (AP), connected to the iris recognition device, the face recognition device and the memory; wherein the application processor is configured to determine a positional relationship between the iris image and the face image, perform living body detection according to the iris image, and determine that the target object is a true face in response to the positional relationship satisfying the preset condition and the iris image being from the living body;
    wherein in determining the positional relationship between the iris image and the face image, the AP is further configured to:
    determine a center point of the iris image;
    perform a contour extraction on the face image to acquire a peripheral contour;
    determine a vertical distance between the center point and the peripheral contour, wherein the vertical distance comprises a first vertical distance and a second vertical distance; and
    determine a ratio of the first vertical distance to the second vertical distance as the positional relationship between the iris image and the face image.

2. The electronic device according to claim 1, wherein in determining the positional relationship between the iris image and the face image, the AP is further configured to:
    extract a key feature in the face image; and
    determine a positional relationship between the key feature and the iris image.

3. The electronic device according to claim 1, wherein in performing the living body detection according to the iris image, the AP is further configured to:
    perform a feature extraction on the iris image to acquire P feature points, wherein P is an integer greater than 1;
    train the P feature points by utilizing a preset classifier to acquire P training values;
    select Q training values from the P training values, wherein each of the Q training values has a training value greater than a preset training threshold; and
    determine that the iris image is acquired from the living body in response to a ratio of Q to P being greater than a preset threshold; wherein Q is a positive integer less than P.

4. The electronic device according to claim 3, wherein the electronic device includes an ambient light sensor configured to acquire a current brightness of ambient light;
    the AP is further configured to determine an image enhancement coefficient corresponding to the current brightness of ambient light; and
    in performing the feature extraction on the iris image, the AP is further configured to:
    perform an image enhancement processing on the iris image according to the image enhancement coefficient, and perform the feature extraction on the iris image after the image enhancement processing.

5. The electronic device according to claim 3, wherein in performing the feature extraction on the iris image, the AP is further configured to:
    perform a binarization processing on the iris image;
    smooth the iris image after the binarization processing; and
    perform the feature extraction on the smoothed iris image.

6. A method for anti-counterfeiting processing, comprising:
    acquiring a face image and an iris image, wherein the face image and the iris image are both acquired from a target object;
    determining a positional relationship between the iris image and the face image, and performing living body detection according to the iris image; and
    determining that the target object is a true face in response to the positional relationship satisfying a preset condition and the iris image being from the living body;

wherein the determining the positional relationship between the iris image and the face image comprises:
    determining a center point of the iris image;
    performing a contour extraction on the face image to acquire a peripheral contour;
    determining a vertical distance between the center point and the peripheral contour, the vertical distance comprising a first vertical distance and a second vertical distance; and
    determining a ratio of the first vertical distance to the second vertical distance as the positional relationship between the iris image and the face image.

7. The method according to claim 6, wherein the determining the positional relationship between the iris image and the face image comprises:
    extracting a key feature in the face image; and
    determining a positional relationship between the key feature and the iris image.

8. The method according to claim 7, wherein the determining the positional relationship between the key feature and the iris image comprises:
    geometrically selecting a first center point of the key feature and a second center point of the iris image; and
    determining a distance between the first center point and the second center point as the positional relationship between the key feature and the iris image.

9. The method according to claim 6, wherein the performing the living body detection according to the iris image comprises:
    performing a feature extraction on the iris image to acquire P feature points, wherein P is an integer greater than 1;
    training the P feature points by utilizing a preset classifier to acquire P training values;
    selecting Q training values from the P training values, wherein each of the Q training values has a training value greater than a preset training threshold; and
    determining that the iris image is acquired from the living body in response to a ratio of Q to P being greater than a preset threshold; wherein Q is a positive integer less than P.

10. The method according to claim 9, wherein the preset classifier is preset by:
    acquiring a positive sample set, wherein the positive sample set comprises X feature points of a first iris image from a living body, and X is a positive integer;
    acquiring a negative sample set, wherein the negative sample set comprises Y feature points of a second iris image from a non-living body, and Y is a positive integer;
    performing a feature extraction on the positive sample set to acquire X groups of features;
    performing a feature extraction on the negative sample set to acquire Y groups of features;
    utilizing a first specified classifier to train the X groups of features to a first class target classifier;
    utilizing a second specified classifier to train the X groups of features to a second class target classifier; and
    determining the first class target classifier and the second class target classifier as the preset classifier.

11. The method according to claim 9, further comprising:
    acquiring a current brightness of ambient light, and determining an image enhancement coefficient corresponding to the current brightness of ambient light;
    wherein the performing the feature extraction on the iris image comprises:
        performing an image enhancement processing on the iris image according to the image enhancement coefficient, and performing the feature extraction on the iris image after the image enhancement processing.

12. The method according to claim 9, wherein the performing the feature extraction on the iris image comprises:
    performing a binarization processing on the iris image;
    smoothing the iris image after the binarization processing; and
    performing the feature extraction on the smoothed iris image.

13. The method according to claim 6, wherein the acquiring the face image and the iris image comprises:
    acquiring the face image in response to an angle of the target object being within a preset angle range;
    determining, according to the face image, a position of an iris; and
    acquiring the iris image by capturing the iris according to the position of the iris.

14. The method according to claim 6, further comprising:
    pre-storing a referenced face image;
    determining a positional relationship between a face and an iris in the referenced face image; and
    determining the preset condition according to the positional relationship.

15. The method according to claim 6, wherein the acquiring the iris image comprises:
    acquiring a current environment parameter;
    determining an iris acquisition parameter according to the current environmental parameter; and
    acquiring the iris image according to the iris acquisition parameter.

16. A non-transitory computer-readable storage medium, storing a computer program for an electronic data interchange, wherein the computer program causes a computer to perform an anti-counterfeiting processing method comprising:
    acquiring a face image and an iris image, wherein the face image and the iris image are both acquired from a target object;
    determining a positional relationship between the iris image and the face image, and performing living body detection according to the iris image; and
    determining that the target object is a true face in response to the positional relationship satisfying a preset condition and the iris image being from the living body;
    wherein the determining the positional relationship between the iris image and the face image comprises:
        determining a center point of the iris image;
        performing a contour extraction on the face image to acquire a peripheral contour;
        determining a vertical distance between the center point and the peripheral contour, the vertical distance comprising a first vertical distance and a second vertical distance; and
        determining a ratio of the first vertical distance to the second vertical distance as the positional relationship between the iris image and the face image.

17. The non-transitory computer-readable storage medium according to claim 16, wherein the determining the positional relationship between the iris image and the face image comprises:
    extracting a key feature in the face image; and
    determining a positional relationship between the key feature and the iris image;
    wherein the performing the living body detection according to the iris image comprises:

performing a feature extraction on the iris image to acquire P feature points, wherein P is an integer greater than 1;
training the P feature points by utilizing a preset classifier to acquire P training values; and
selecting Q training values from the P training values, wherein each of the Q training values has a training value greater than a preset training threshold; determining that the iris image is acquired from the living body in response to a ratio of Q to P being greater than a preset threshold; wherein Q is a positive integer less than P.

\* \* \* \* \*